United States Patent
Licata et al.

(10) Patent No.: US 10,769,275 B2
(45) Date of Patent: Sep. 8, 2020

(54) SYSTEMS AND METHODS FOR MONITORING BAIT TO PROTECT USERS FROM SECURITY THREATS

(71) Applicant: CA, INC., San Jose, CA (US)

(72) Inventors: Adam Licata, South Orange, NJ (US); Alpesh Mote, Irvine, CA (US); Torry Campbell, Chandler, AR (US)

(73) Assignee: CA, Inc., San Jose, CA (US)

( * ) Notice: Subject to any disclaimer, the term of this patent is extended or adjusted under 35 U.S.C. 154(b) by 50 days.

(21) Appl. No.: 15/727,218

(22) Filed: Oct. 6, 2017

(65) Prior Publication Data

US 2019/0108333 A1 Apr. 11, 2019

(51) Int. Cl.

| | |
|---|---|
| G06F 21/55 | (2013.01) |
| H04L 29/06 | (2006.01) |
| H04L 12/24 | (2006.01) |
| G06F 21/62 | (2013.01) |
| G06F 21/56 | (2013.01) |
| H04W 12/12 | (2009.01) |
| G06F 21/53 | (2013.01) |
| G06F 21/57 | (2013.01) |
| G06F 21/71 | (2013.01) |

(52) U.S. Cl.
CPC .......... *G06F 21/554* (2013.01); *G06F 21/53* (2013.01); *G06F 21/55* (2013.01); *G06F 21/56* (2013.01); *G06F 21/577* (2013.01); *G06F 21/62* (2013.01); *G06F 21/71* (2013.01); *H04L 41/28* (2013.01); *H04L 63/02* (2013.01); *H04L 63/1491* (2013.01); *H04W 12/1208* (2019.01); *G06F 21/57* (2013.01); *H04L 63/10* (2013.01); *H04L 63/1408* (2013.01)

(58) Field of Classification Search
CPC ...... G06F 21/554; G06F 21/53; G06F 21/577; G06F 21/71
See application file for complete search history.

(56) References Cited

U.S. PATENT DOCUMENTS

| | | |
|---|---|---|
| 7,461,402 B1 | 12/2008 | Lyle et al. |
| 7,827,605 B2 | 11/2010 | Lyle et al. |

(Continued)

FOREIGN PATENT DOCUMENTS

| | | |
|---|---|---|
| AU | 6103900 A | 1/2001 |
| EP | 1210665 A4 | 6/2002 |
| WO | WO2001004727 A1 | 1/2001 |

OTHER PUBLICATIONS https://attivonetworks.com/minimizing-false-positives-in-cloud-security-monitoring/.

*Primary Examiner* — Ayoub Alata
(74) *Attorney, Agent, or Firm* — FisherBroyles, LLP (57) ABSTRACT

The disclosed computer-implemented method for monitoring bait to protect users from security threats may include (i) monitoring a bait computing resource to detect attempts to access the bait computing resource, (ii) virtualizing the bait computing resource to prevent a false positive by hiding the bait computing resource from at least one trusted application that has been categorized as safe, (iii) detecting an attempt by a different application to access the virtualized bait computing resource, and (iv) performing a security action to protect a trusted user by reporting the attempt to access the virtualized bait computing resource by the different application. Various other methods, systems, and computer-readable media are also disclosed.

20 Claims, 6 Drawing Sheets

(56) References Cited

U.S. PATENT DOCUMENTS

| | | | |
|---|---|---|---|
| 8,494,964 B1* | 7/2013 | Sanderson | G06F 21/121 380/227 |
| 9,418,222 B1* | 8/2016 | Rivera | G06F 21/554 |
| 2008/0141374 A1* | 6/2008 | Sidiroglou | G06F 21/554 726/23 |
| 2009/0231998 A1* | 9/2009 | Bharadwaj | H04L 63/0227 370/230 |

* cited by examiner

SYSTEMS AND METHODS FOR MONITORING BAIT TO PROTECT USERS FROM SECURITY THREATS

BACKGROUND

Individuals and organizations often deploy one or more security solutions to protect users and employees from security threats. Some conventional security solutions may include firewalls and antivirus products. These conventional solutions may scan computing resources for fingerprints indicating known security threats. Upon detecting one or more known security threats, the conventional solutions may perform a remedial action. For example, the conventional solutions may report the detection of the known security threat to a user or an administrator.

Despite the conventional security solutions that are discussed above, some attackers may nevertheless still succeed in compromising an organization's computing network and resources. For example, the attackers may engage in acts of deception to trick or deceive the conventional security solutions such that they fail to detect a corresponding security threat. Accordingly, individuals and organizations that deploy security solutions to protect their users and employees may nevertheless benefit from improvements in the security solutions along one or more dimensions, as discussed further below.

SUMMARY

As will be described in greater detail below, the instant disclosure describes various systems and methods for monitoring bait to protect users from security threats. In one example, a computer-implemented method for monitoring bait to protect users from security threats may include (i) monitoring a bait computing resource to detect attempts to access the bait computing resource, (ii) virtualizing the bait computing resource to prevent a false positive by hiding the bait computing resource from at least one trusted application that has been categorized as safe, (iii) detecting an attempt by a different application to access the virtualized bait computing resource, and (iv) performing a security action to protect a trusted user by reporting the attempt to access the virtualized bait computing resource by the different application.

In one embodiment, the virtualized bait computing resource may include a registry key and/or a file. In some examples, virtualizing the bait computing resource is performed by an operating system filter driver.

In further examples, virtualizing the bait computing resource to prevent the false positive may include (i) generating a list of trusted applications and (ii) virtualizing the bait computing resource to hide the bait computing resource from each application on the list of trusted applications. In some examples, generating the list of trusted applications may include identifying applications that are used by the trusted user.

In some examples, virtualizing the bait computing resource renders the bait computing resource invisible to the trusted user. In one embodiment, the attempt to access the virtualized bait computing resource by the different application is reported to an administrator to enable the administrator to investigate whether the attempt constitutes an attempted security breach.

In further embodiments, the bait computing resource is deployed across a network from a management service to an endpoint agent on the computing device. In one embodiment, the method is performed through an EPDRP platform that is executing on the computing device. In further examples, the EPDRP platform deploys the bait computing resource by leveraging an existing deployment function that was previously used to deploy non-bait computing resources.

In one embodiment, a system for implementing the above-described method may include (i) a monitoring module, stored in memory, that monitors a bait computing resource to detect attempts to access the bait computing resource, (ii) a virtualization module, stored in memory, that virtualizes the bait computing resource to prevent a false positive by hiding the bait computing resource from at least one trusted application that has been categorized as safe, (iii) a detection module, stored in memory, that detects an attempt by a different application to access the virtualized bait computing resource, (iv) a performance module, stored in memory, that performs a security action to protect a trusted user by reporting the attempt to access the virtualized bait computing resource by the different application, and (v) at least one physical processor configured to execute the monitoring module, the virtualization module, the detection module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) monitor a bait computing resource to detect attempts to access the bait computing resource, (ii) virtualize the bait computing resource to prevent a false positive by hiding the bait computing resource from at least one trusted application that has been categorized as safe, (iii) detect an attempt by a different application to access the virtualized bait computing resource, and (iv) perform a security action to protect a trusted user by reporting the attempt to access the virtualized bait computing resource by the different application.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for monitoring bait to protect users from security threats. The example systems and methods may improve upon related systems and methods in a variety of ways. In one example, the systems and methods may optionally virtualize a bait computing resource to prevent a false positive by hiding the bait computing resource from a trusted application. Hiding the bait computing resource through virtualization effectively prevents the trusted application from accessing the bait computing resource. Because the trusted application is trusted and categorized as safe, attempts by the trusted application to access the bait computing resource can be assumed to be false positives (i.e., do not indicate genuine attempts at security breaches), and therefore do not need to be investigated. Accordingly, hiding the bait computing resource through virtualization eliminates the needless investigation of these false positives, because the false positives do not occur when the bait computing resource is invisible to the trusted application through virtualization.

Additionally, or alternatively, the example systems and methods may improve upon related systems and methods by leveraging existing components of a security solution, such as an endpoint protection-detection-and-response platform ("EPDRP") to monitor and detect bait computing resources (e.g., with or without virtualizing the bait computing resources). In this scenario, the example systems and methods may improve upon related systems and methods by eliminating one or more of the following: the installation of an additional physical or virtual server, the reconfiguration of network resources such as network routes, VLANS, and/or firewall rules, the limitation of monitoring only a subset portion of an organization's network rather than the entire network, the limitation of requiring the endpoint to be connected to the organization's managed network in order to monitor the bait computing resource, an additional network resource to monitor for adversarial activity, reconfiguration of certain endpoint or network services and controls (such as turning on remote access or management services, and/or opening network firewall ports), and/or reliance on additional INFORMATION TECHNOLOGY infrastructure, such as a software distribution platform. In this scenario, the example systems and methods may achieve these benefits, and eliminate one or more of the features listed above, by leveraging, or repurposing, existing functionality of the EPDRP platform, which were previously used to deploy and monitor non-bait computing resources, for the deployment and monitoring of bait computing resources, as discussed further below.

Figure 1:
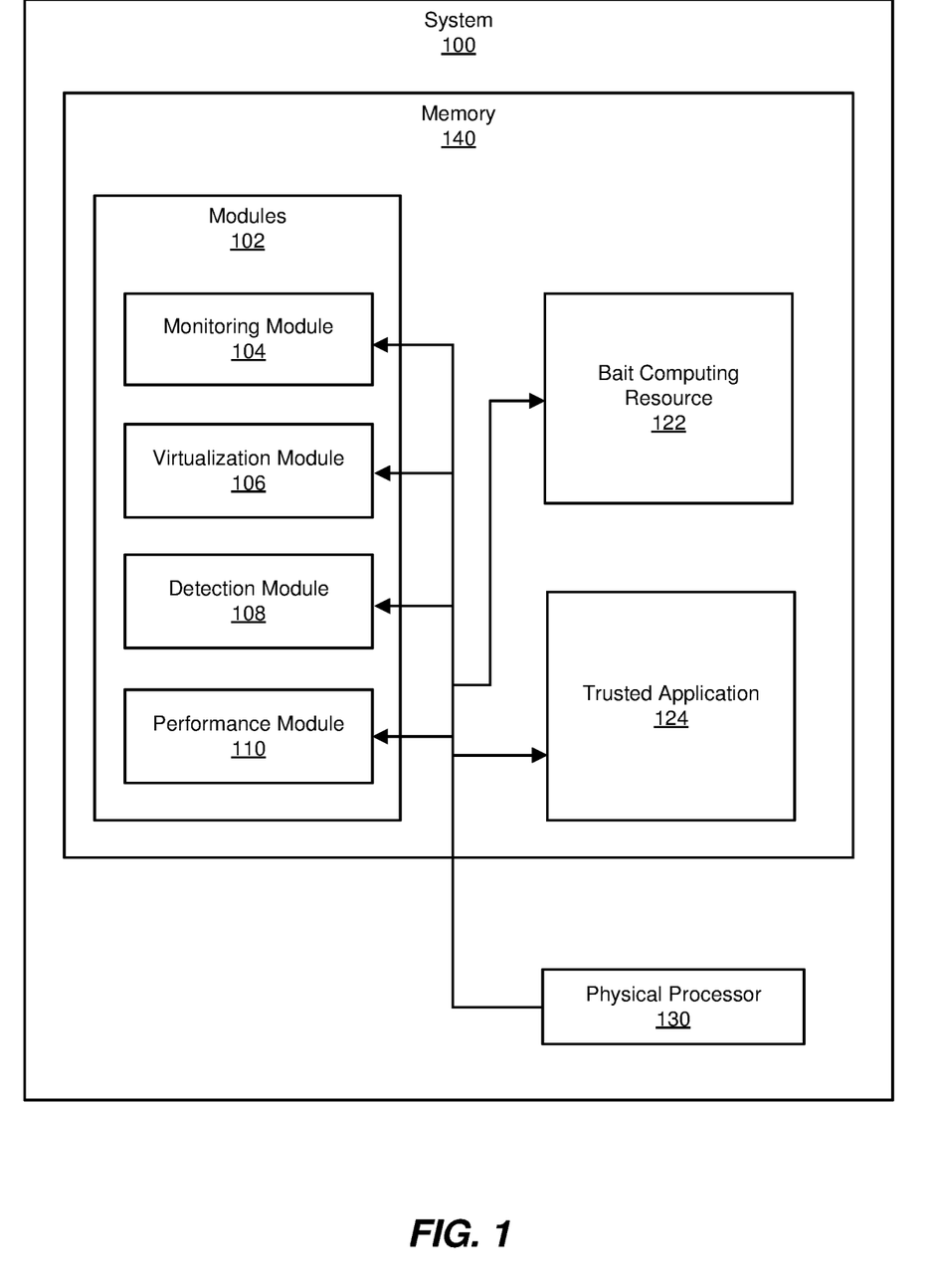
FIG. 1 is a block diagram of an example system for monitoring bait to protect users from security threats.
Figure 2:
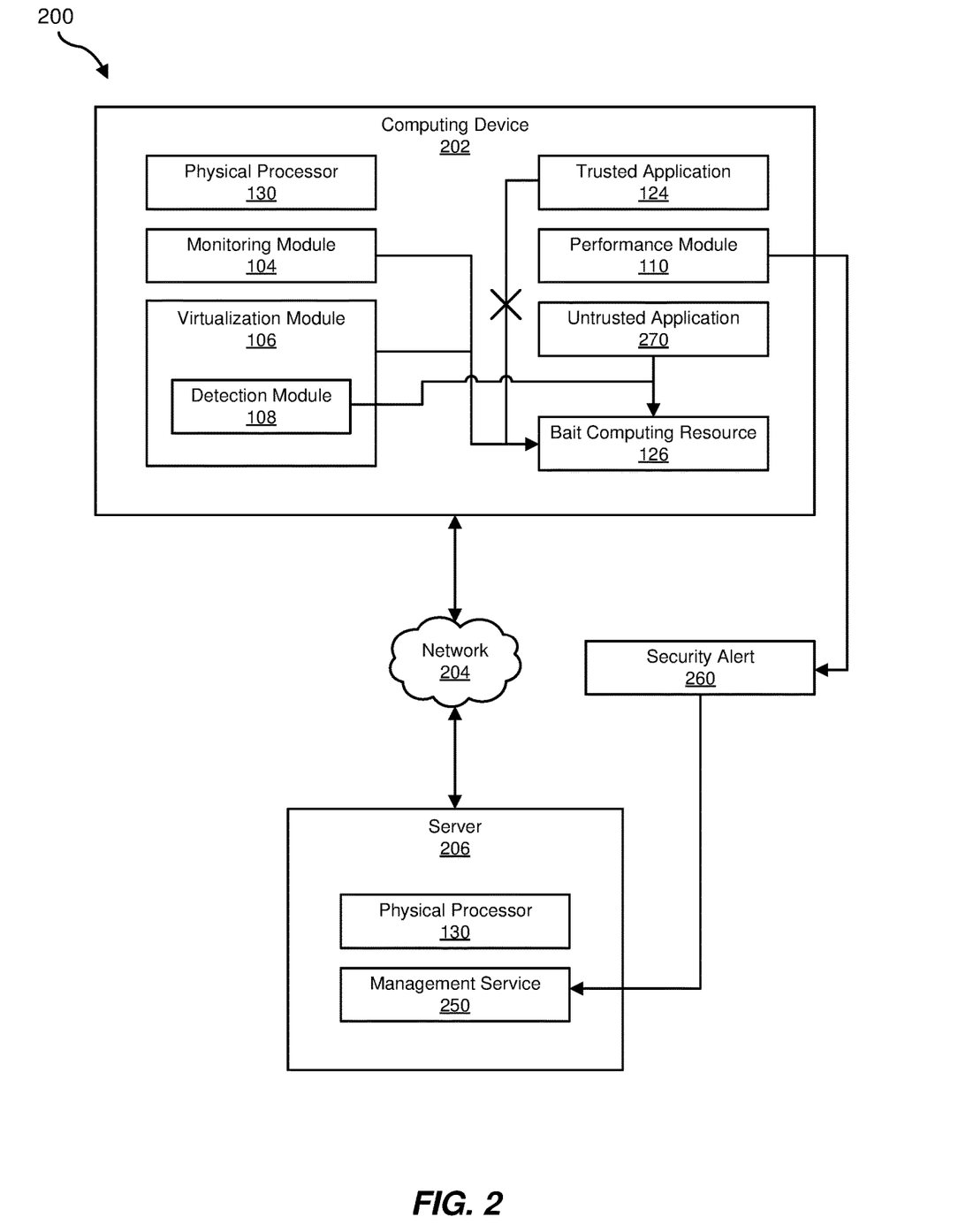
FIG. 2 is a block diagram of an additional example system for monitoring bait to protect users from security threats.

The following will provide, with reference to FIGS. 1-2, detailed descriptions of example systems for monitoring bait to protect users from security threats. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for monitoring bait to protect users from security threats. As illustrated in this figure, example system 100 may include one or more modules 102 for performing one or more tasks. For example, and as will be explained in greater detail below, example system 100 may include a monitoring module 104 that monitors a bait computing resource 122 to detect attempts to access bait computing resource 122. Example system 100 may additionally include a virtualization module 106 that virtualizes bait computing resource 122 to prevent a false positive by hiding bait computing resource 122 from at least one trusted application 124 that has been categorized as safe. Example system 100 may also include a detection module 108 that detects an attempt by a different application to access bait computing resource 122. Example system 100 may additionally include a performance module 110 that performs a security action to protect a trusted user by reporting the attempt to access bait computing resource 122 by the different application. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate monitoring bait to protect users from security threats. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to monitor bait to protect users from security threats.

For example, and as will be described in greater detail below, monitoring module 104 may monitor bait computing resource 122 to detect attempts to access bait computing resource 122. Virtualization module 106 may virtualize bait computing resource 122 to prevent a false positive by hiding bait computing resource 122 from trusted application 124 that has been categorized as safe. The "X" shown in FIG. 2 along the line connecting trusted application 124 and bait computing resource 126 indicates that virtualization module 106 has effectively hidden bait computing resource 126 from trusted application 124 using virtualization, as discussed further below. Detection module 108 may detect an attempt by a different application, such as an untrusted application 270, to access virtualized bait computing resource 122. Performance module 110 may perform a security action to protect a trusted user by reporting the attempt to access bait computing resource 122 by untrusted application 270.

In addition to the above, FIG. 2 further illustrates how performance module 110 may perform the security action by issuing a security alert 260. In this example, performance module 110 performs the security action by issuing security alert 260 to a management service 250 executed by server 206. Nevertheless, in additional or alternative examples, performance module 110 may perform the security action by issuing security alert 260 to any suitable user or administrator, as discussed further below.

Computing device 202 generally represents any type or form of computing device capable of reading computer-executable instructions. In general, computing device 202 may correspond to an endpoint computing device that is protected by a security system that includes modules 102. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing, or facilitating the performance of, method 300. In some examples, server 206 may execute a management service, as discussed further below. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
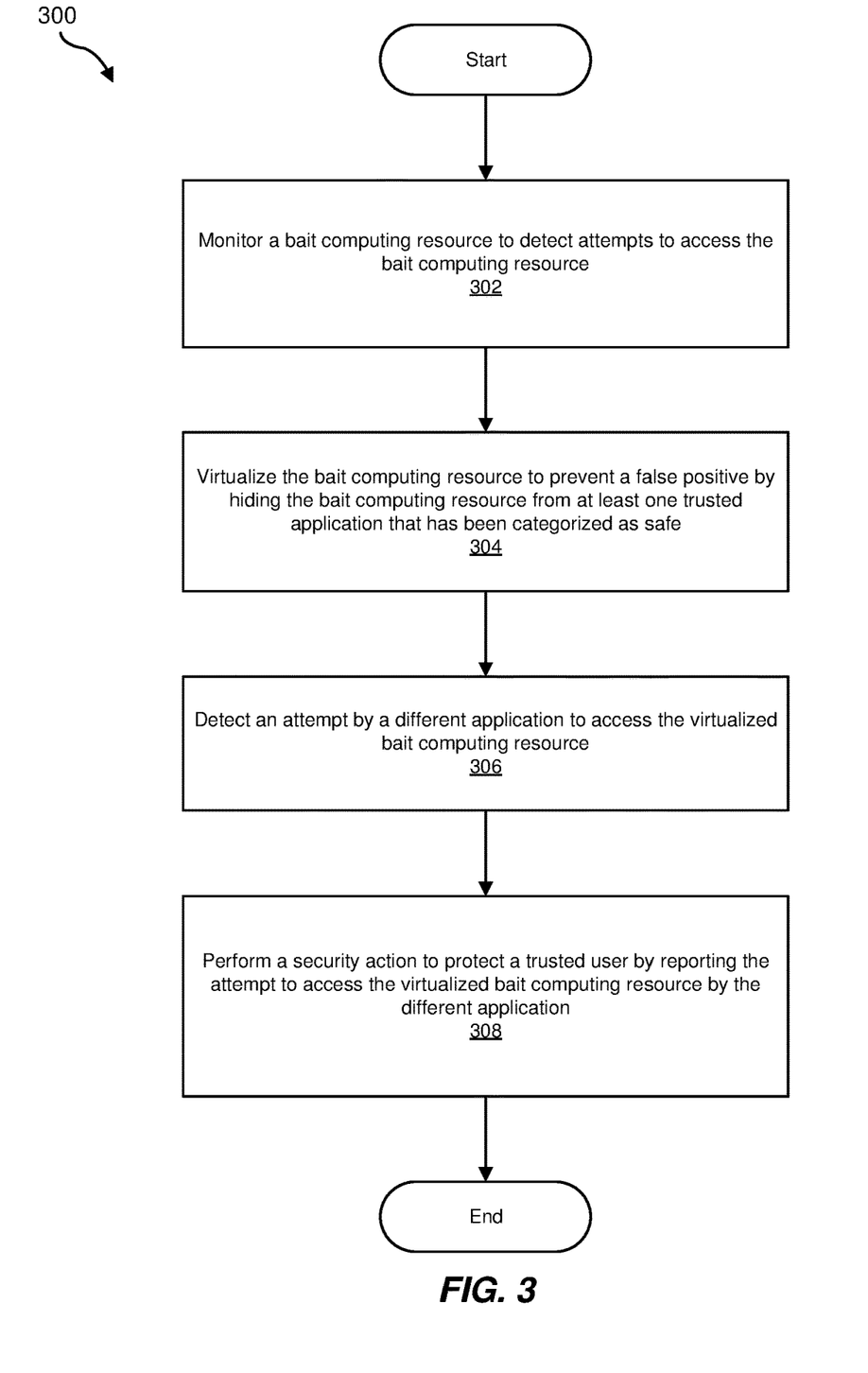
FIG. 3 is a flow diagram of an example method for monitoring bait to protect users from security threats.

FIG. 3 is a flow diagram of an example computer-implemented method 300 for monitoring bait to protect users from security threats. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may monitor a bait computing resource to detect attempts to access the bait computing resource. For example, monitoring module 104 may, as part of computing device 202 in FIG. 2, monitor bait computing resource 122 to detect attempts to access bait computing resource 122. As used herein, the term "bait computing resource" generally refers to a computing resource that has been deployed as bait within a security system trap to detect an attempted security breach when an attacker, or an application or process used by the attacker, attempts to access the bait.

In some examples, the bait may optionally be configured such that the bait does not perform a substantial legitimate function within computing device 202, other than functioning as bait within the security system trap. In further examples, the bait may be configured to simulate, emulate, or appear as a computing resource that performs an additional substantial legitimate function, thereby enticing or attracting the attacker to access the bait. For example, the bait may share the same name, identifier, appearance, and/or location as a key, significant, central, important, and/or critical system computing resource, such as an operating system registry key or security setting. Examples of computing resources that can be deployed as bait include files, registry entries or keys, directories, processes, user accounts, network shares, network services, and/or configuration settings. In one specific example, the bait computing resource may include a history of a REMOTE DESKTOP PROTOCOL session on a computing device such as computing device 202.

Figure 4:
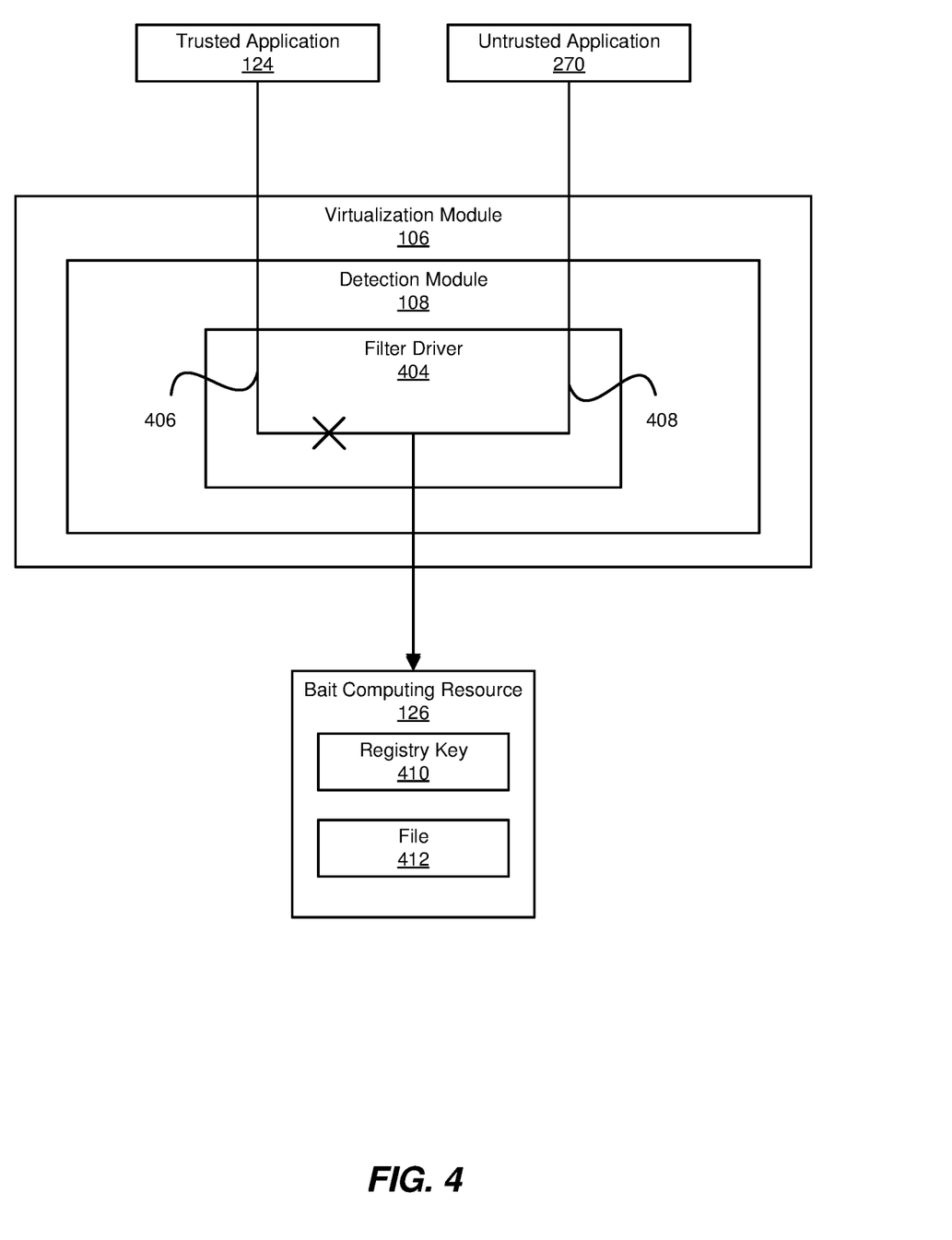
FIG. 4 is a block diagram that illustrates the virtualization of the bait computing resource.

Monitoring module 104 may monitor the bait computing resource in a variety of ways. In general, monitoring module 104 may monitor the bait computing resource using an operating system filter driver. As used herein, the term "operating system filter driver" generally refers to a driver at an operating system level that selectively filters access or visibility to one or more computing resources from one or more applications or processes. The driver may perform the filtering function when a virtualization layer is turned on in accordance with application virtualization technology. The driver may be configured to reference a virtualization policy that defines which applications will have access or visibility to which corresponding computing resources. In response, the driver may apply the virtualization policy by intercepting one or more attempts to access the computing resources, checking whether the applications attempting to access the computing resources have permission according to the virtualization policy, and selectively rendering the computing resources invisible in accordance with the virtualization policy (e.g., by selectively blocking the access requests and/or selectively omitting the computing resources from a list of available computing resources when the virtualization policy indicates that these computing resources should be invisible to the requesting application or process). FIG. 4 shows an example of a filter driver 404, which is discussed in more detail below in connection with step 304 of method 300.

In one embodiment, monitoring module 104 receives the bait computing resource across network 204 from management service 250. Moreover, modules 102 may form part of an EPDRP platform that is executing on computing device 202 and that performs method 300, as discussed further below. In one embodiment, the EPDRP platform optionally deploys the bait computing resource by leveraging an existing deployment function that was previously used to deploy non-bait computing resources, and/or by leveraging an existing monitoring function that was previously used to monitor non-bait computing resources, thereby eliminating or overcoming any requirement to use or install additional servers, infrastructure, and/or components to detect security threats by setting the bait computing resource as a trap (i.e., beyond configuring the EPDRP platform to perform method 300, with or without virtualizing the bait computing resource).

At step 304, one or more of the systems described herein may virtualize the bait computing resource to prevent a false positive by hiding the bait computing resource from at least one trusted application that has been categorized as safe. For example, virtualization module 106 may, as part of computing device 202 in FIG. 2, virtualize bait computing resource 122 to prevent a false positive by hiding bait computing resource 122 from trusted application 124 that has been categorized as safe.

As used herein, the phrase "virtualize" generally refers to selectively rendering a computing resource available or visible (or unavailable or invisible) to a requesting application or process in accordance with a virtualization policy that defines when the application or process will have access or visibility, as discussed further above. In some examples, virtualization module 106 may perform virtualization in response to turning on one or more virtualization layers, where the layer corresponds to the implementation of a corresponding virtualization policy. Moreover, as used herein, the term "false positive" generally refers to a security alert that was triggered by innocuous or legitimate computing activity rather than a genuine attempted security breach.

Furthermore, as used herein, the phrase "categorized as safe" simply refers to the application being trusted such that the bait computing resource is hidden from the trusted application, in accordance with step 304, to prevent false positives that would otherwise occur when a trusted user tries to access the bait computing resource. Step 304 prevents the false positives by eliminating the access or visibility to the bait computing resource, thereby preventing the trusted user and trusted application from attempting to access the bait computing resource.

Virtualization module 106 may virtualize the bait computing resource in a variety of ways. In general, virtualization module 106 may virtualize the bait computing resource using an operating system filter driver, as further discussed above in connection with step 302 of method 300. In some examples, virtualization module 106 may virtualize the bait computing resource by intercepting and blocking a request for the bait computing resource. In additional or alternative examples, virtualization module 106 may virtualize the bait computing resource by omitting an identifier, name, or listing of the bait computing resource within a list of computing resources returned in response to a request for available computing resources. In one specific example, virtualization module 106 may virtualize the bait computing resource by omitting the bait computing resource from a list of available files and/or registry keys (i.e., omitting the bait computing resource from a list of those files and/or registry keys that are available at a location specified by the request).

In some examples, virtualization module 106 may virtualize the bait computing resource by (i) generating a list of trusted applications and (ii) hiding the bait computing resource, through virtualization, from each application on the list of trusted applications. In other words, virtualization module 106 may identify a list of applications that are associated with the trusted user and, therefore, would otherwise potentially access the bait computing resource in false positive events, as discussed above. Accordingly, virtualization module 106 may comprehensively identify these applications associated with the trusted user and selectively render the bait computing resource unavailable and/or invisible to these applications, thereby preventing the false positive events. For example, the trusted application may include an operating system component that allows a user to control the remote computer or virtual machine over a network connection. In additional or alternative examples, the trusted application may include an operating system registry editor. Specific examples of these trusted applications may include MICROSOFT TERMINAL SERVICES CLIENT (mstsc.exe), which may also be referred to as REMOTE DESKTOP SERVICES, and/or WINDOWS REGISTRY EDITOR (regedit.exe). In some examples, the trusted application may automatically (e.g., upon launching) attempt to list, access, and/or interact with the bait computing resource(s), such as one or more items within the operating system registry.

FIG. 4 illustrates an example workflow according to which virtualization module 106 virtualizes the bait computing resource in accordance with step 304 of method 300. As further shown in this figure, virtualization module 106, which may optionally include detection module 108, may intercept or receive a computing resource access request 406 and/or another computing resource access request 408 from trusted application 124 and untrusted application 270, respectively. Furthermore, virtualization module 106 may optionally use filter driver 404 to apply the virtualization policy that virtualizes bait computing resource 126 in a manner that renders bait computing resource 126 invisible to trusted application 124 but still visible to untrusted application 270. The bait computing resource may optionally include a registry key 410 and/or a file 412, as further discussed above.

In this example, trusted application 124 may correspond to an application that was previously defined as known to be safe or trusted because it is used by a trusted user. In contrast, untrusted application 270 may correspond to any other application that was not included on a list of trusted applications. For example, untrusted application 270 may correspond to a virus, malware, hacking, or remote application. In some examples, virtualization module 106 may distinguish between trusted applications and untrusted applications based on a user account that originates, controls, launches, or authorizes these applications (i.e., such that trusted user accounts launch trusted applications and untrusted user accounts launch untrusted applications).

As further shown in FIG. 4, virtualization module 106 may selectively block, or deny, computing resource access request 406 from trusted application 124, because the virtualization policy defines bait computing resource 126 as being invisible to trusted application 124, thereby preventing trusted application 124 from triggering false positives by attempting to access bait computing resource 126. As used herein, the phrase "block" generally refers to directly blocking the computing resource access request, failing to respond to the computing resource access request, and/or omitting the bait computing resource from a list of computing resources returned in response to the access request (i.e., failing to mention that the bait computing resource is existent or available, thereby rendering the bait computing resource invisible to the requesting application or process), as described further above.

In contrast, virtualization module 106 may respond to computing resource access request 408 from untrusted application 270 in a conventional manner, as if the virtualization policy was not being applied (e.g., as if the corresponding virtualization layer was turned off), thereby satisfying the request by providing untrusted application 270 with access or visibility to the bait computing resource. Virtualization module 106 may accordingly set a trap for an attacker to detect when the attacker attempts to access the bait computing resource, while simultaneously preventing the trusted user of trusted application 124 from inadvertently generating a false positive. Because virtualization module 106 may render the bait computing resource invisible to trusted application 124, trusted application 124 and/or the trusted user may, in some examples, not even be aware that the bait computing resource exists on computing device 202. Avoiding the generation of false positives may substantially reduce the amount of time and/or resources used to investigate security alerts in response to attempts to access the bait computing resource (i.e., in comparison to scenarios where the bait computing resource has not been virtualized).

At step 306, one or more of the systems described herein may detect an attempt by a different application to access the virtualized bait computing resource. For example, detection module 108 may, as part of computing device 202 in FIG. 2, detect an attempt by untrusted application 270 to access bait computing resource 122. As used herein, the term "different application" generally refers to any application not included within the "at least one application" of step 304.

Detection module 108 may detect the attempt by the different application to access the virtualized bait computing resource in a variety of ways. In general, detection module 108 may optionally operate as part of virtualization module 106, as illustrated in FIG. 2 and further illustrated in FIG. 4. Moreover, in general, detection module 108 may detect the attempt by the different application to access the virtualized bait computing resource using the same operating system filter driver, such as filter driver 404 of FIG. 4, that was used to perform virtualization, as discussed above in accordance with step 304 of method 300. In general, virtualization module 106 may receive, or intercept, one or more (or all) computing resource access requests that are issued within the operating system over a period of time. In response to receiving, or intercepting, the computing resource access requests, virtualization module 106 and/or detection module 108 may check whether the application or process attempting to access the corresponding computing resource has permission, access, and/or visibility to the corresponding computing resource in accordance with the virtualization policy, as discussed above. In response to that checking, virtualization module 106 and/or detection module 108 may determine that the application or process does not have permission, access, and/or visibility according to the virtualization policy. Consequently, this determination may trigger detection module 108 to detect the attempt by the different application to access the virtualized bait computing resource in accordance with step 306 of method 300.

At step 308, one or more of the systems described herein may perform a security action to protect a trusted user by reporting the attempt to access the virtualized bait computing resource by the different application. For example, performance module 110 may, as part of computing device 202 in FIG. 2, perform a security action to protect a trusted user by reporting the attempt to access bait computing resource 122 by untrusted application 270. As used herein, the term "trusted user" generally refers to any user protected by system 200 in accordance with method 300, the user that establishes or installs system 200, and/or the user associated with the one or more applications that virtualization module 106 renders invisible, as discussed further above.

Performance module 110 may perform the security action to protect the trusted user in a variety of ways. In general, performance module 110 may autonomously, automatically, or semi-automatically issue a notification to notify a user (e.g., the trusted user) or administrator of the attempt by the different application to access the bait computing resource. Furthermore, performance module 110 may report the attempt to access the virtualized bait computing resource by the different application to an administrator to enable the administrator to investigate whether the attempt constitutes an attempted security breach. Performance module 110 may issue a notification in the form of a text message, SHORT MESSAGE SERVICE message, email, message board message, pop-up message, telephone message, audio alert, and/or any other suitable form of electronic communication. Moreover, in some examples the notification may optionally include metadata describing one or more attributes relating to the attempt by the different application to access the bait computing resource. For example, the metadata may identify the different application, a process launched by the different application, a user account that originated, installed, and/or executed the different application, the timing of the attempt to access the bait computing resource, an indication of whether the attempt to access the bait computing resource was successful, and/or an indication of any further action or editing that the different application performed on the bait computing resource, etc.

Moreover, in further examples the security action performed by performance module 110 may include additional remedial actions in addition to issuing the security alert or notification discussed above. For example, the security action performed by performance module 110 may further include one or more of the following: enabling or heightening a security measure or feature, freezing or quarantining the different application and/or a remote computing device that is executing the different application, scanning computing device 202 to take an inventory or snapshot of its contents and/or configuration, deriving one or more insights about the identity, nature, and/or configuration of a security threat or security attack, uploading forensic data of system activity, enhancing tracing of system activity, deploying one or more additional bait computing resources (e.g., such as network services), and/or redirecting network traffic. For example, performance module 110 may optionally redirect network requests such as web requests, SOFTWARE-AS-A-SERVICE traffic, FILE TRANSFER PROTOCOL requests, and/or file share access requests. Along with redirection of network traffic, performance module 110 may optionally redirect any one or more of these items to itself as part of modules 102 executing within computing device 202.

The above discussion provides a detailed overview of the performance of method 300, as shown in FIG. 3. In addition, the following discussion provides an additional overview of concrete embodiments of the disclosed systems and methods. Moreover, any one or more of the features or steps described below may be performed by one or more of modules 102, using the most suitable or appropriate module, and consistent with the description of method 300 above.

In one scenario, which involves virtualization, the disclosed systems and methods may virtualize monitored objects on an endpoint to reduce the risk of user interaction causing a false positive in a deception security program. The disclosed systems and methods may thereby overcome the following problem. Organizations implementing a deception security program typically monitor the generated events to determine if they indicate a security breach. The deception program monitors various objects on the endpoint computing device, such as files and registry keys. If an authorized user or legitimate application interacts with a monitored object, the resulting event will be analyzed by the security team to determine if the activity is innocuous or caused by an attacker. If the activity is innocuous, the related events are known as false positives. The time spent analyzing these events can be costly depending on the volume.

In view of the above, the disclosed systems and methods may virtualize monitored objects to thereby hide them from users and legitimate applications, greatly reducing the risk of generating false positives. The disclosed systems and methods may thereby improve on related systems that do not perform virtualization to hide the bait computing resource(s), which leads to false positives, as described further below.

In some examples, virtualized objects are monitored and interactions with these objects originating from applications that are not in control by a legitimate user are reported to the security administrator. The purpose of virtualizing the objects, in this example, is to hide them from legitimate users and thereby minimize false positives.

The disclosed systems and methods may rely on the following technical concepts. The monitored objects may be virtualized at a low level in the operating system in a way that only attackers would be able to see them. This ensures that the monitored objects deceive attackers into interacting with them, but remain unseen by legitimate uses to avoid false positives.

The disclosed systems and methods may optionally include the following implementation details. Virtualization may be performed using a filter driver that is installed on the device. The monitored objects may be loaded into the filter driver and configured so that legitimate applications and/or users are not aware that the objects exist. For each monitored object, a set of processes used by legitimate users and applications would be excluded, so that they cannot see the object. Any applications or processes initiated by an attacker would see these objects and not know that these objects are virtualized. Any relevant interactions with these objects are reported as events to the security administrator for the purpose of investigation.

The following example illustrates one specific manner of performing the virtualization of the bait computing resource. The bait computing resource may include a history of REMOTE DESKTOP PROTOCOL (RDP) sessions on a device. The RDP history may include a registry key that is virtualized by the filter driver installed on the operating system. The filter driver may be configured to not reveal the registry key to legitimate applications such as MICROSOFT TERMINAL SERVICES CLIENT (mstsc.exe) and WINDOWS REGISTRY EDITOR (regedit.exe). After an attacker has breached the device, the attacker may use a tool to retrieve the RDP session history from the device by accessing the virtualized registry key. This access attempt is reported by the endpoint security software to the security administrator. The administrator then optionally investigates this event to determine if a breach has occurred and the extent of it. By virtualizing the registry key and hiding it from legitimate applications used by authorized users, normal interaction with that key, such as the user launching the MICROSOFT TERMINAL SERVICES CLIENT (mstsc.exe), does not result in a false positive for the security administrator to investigate.

In addition to the above, the disclosed systems and methods may also include a second scenario that may optionally include, or omit, the virtualization of the bait computing resource, as discussed further below. The second scenario may refer to a cyber deception system using an endpoint-protection-detection-and-response-platform (EPDRP). The second scenario may address the following problem. Cyberattacks continue to increase in sophistication, complexity, and frequency. Organizations typically employ a set of endpoint-based and network-based technologies to prevent and detect attacks targeted at their networks and endpoints. In addition, related systems may use deception technologies, such as network honeypots and distributed deception systems, to create artificial attack targets, commonly called "bait," with the intent of providing another layer of attack detection. While these solutions address the issue of identifying otherwise undetected attacks, the solutions nevertheless have multiple deficiencies that are resolved, or ameliorated, by the disclosed systems and methods, as discussed further below.

The disclosed systems and methods may leverage an existing ENDPOINT PROTECTION PLATFORM (e.g., such as an EPDRP) to create a deception system without deploying additional software agents and/or hardware. The disclosed systems and methods deliver deception capabilities regardless of whether an endpoint is connected to an organization's network or not. In other words, the entire process of monitoring and detecting attempts to access the bait computing resource may be performed on the endpoint computing device (e.g., after receiving the bait computing resource and/or the corresponding security policy from a management service).

In one example, the disclosed systems and methods may leverage existing components of an EPDRP to discover, deploy, monitor, and/or engage an attacker with deception. The system may optionally include the management service application (e.g., management service 250) and an endpoint agent (e.g., one or more of modules 102, as appropriate and consistent with the description of method 300 above). Additional components such as software and content distribution mechanisms can optionally be used if available. The disclosed systems and methods may leverage the ability of the EPDRP to configure endpoint monitoring policies, deploy content (such as scripts and binaries), execute commands on the endpoint, and/or monitor endpoint system activity. These capabilities are sometimes available in related EPDRP solutions but are only used for monitoring for threats and inspecting existing system objects and behaviors. In other words, the related EPDRP solutions use the monitoring and detection functionality to monitor non-bait computing resources rather than bait computing resources. Accordingly, the disclosed systems and methods may leverage these existing capabilities to discover a system configuration, deploy bait objects (e.g., optionally called "DECEPTOR" objects or bait computing resources), and/or monitor any interaction with these DECEPTORs.

As used herein, the term "DECEPTOR" generally refers to the program, script, and/or module that deploys one or more corresponding DECEPTOR objects. In other words, the DECEPTOR may correspond to a "wrapper" or agent that effectively deploys, controls, and/or facilitates the monitoring of a DECEPTOR object. In general, a deception module within system 100 and/or system 200 (not shown in FIGS. 1 and 2) may perform any one or more of the features, functions, and/or steps performed by a "DECEPTOR," as described below, and consistent with the description of method 300 above (e.g., with or without virtualizing the bait computing resource or DECEPTOR object).

The management service may perform the following functions, features, and/or steps. The management service, whether deployed on premise or as a cloud service, allows the administrative user (i.e., "administrator" or "admin") to configure the deception policy which defines which DECEPTORs will be deployed and monitored. The administrator can also configure the deployment of the DECEPTORs through the management console. The disclosed systems and methods may use the existing EPDRP monitoring functions to monitor and alert on file, registry, network, process, memory, system event, and/or other system activity. By monitoring the DECEPTOR objects, the system can alert admins of the potential adversarial activity. The disclosed systems and methods (e.g., performance module 110) may also provide insight into the tactics, techniques, and procedures being used against endpoints by not only triggering the specific DECEPTOR interaction but also optionally recording all activity on the system both before and after the attempt to access the specific DECEPTOR. Any events that are captured as part of a DECEPTOR trigger will be sent from the endpoint agent up to the management service for viewing and analysis. In addition, full system recording of all activity prior to and after the DECEPTOR trigger may be uploaded automatically or manually retrieved for investigation and analysis. The management service may optionally also collect all DECEPTOR configurations sent from the endpoint agent. This will allow the disclosed systems and methods to dynamically tune the individual DECEPTOR configurations on each endpoint based on the number of events triggered by a specific DECEPTOR configuration and whether those were determined to be false positives, true positives, false negatives, or true negatives.

The endpoint agent, which may correspond to modules 102 of FIGS. 1 and 2, may perform the following features, functions, and/or steps. In some examples, the DECEPTORs may constitute the unique part of the system as they are the delivery and configuration mechanisms that control the installation and configuration of the DECEPTOR objects or "bait" computing resources on a per-system basis. A DECEPTOR can be created using operating system scripts, compiled code, and/or proprietary EPDRP instructions, which may allow the DECEPTOR to analyze each endpoint and create common or unique bait objects. Examples of these artificial objects may include, but are not limited to, files, directories, processes, user accounts, network shares, network services, registry entries, and/or configuration settings.

When a DECEPTOR is deployed to an endpoint, it first analyzes the endpoint to determine the appropriate configuration and then deploys the DECEPTOR objects (e.g., the bait computing resources) and records the DECEPTOR configuration for that system. This allows the DECEPTOR to be monitored, dynamically reconfigured, and/or removed at an organization, group, or system level. The DECEPTORs may also make full use of the endpoint protection, detection, and response functionality of the endpoint agent. This optionally includes monitoring specific DECEPTORs, recording system activity continuously, redirecting network traffic, and/or hosting local DECEPTOR services for adversarial engagement.

First, the administrator may configure the DECEPTOR policy. This policy may optionally define what type of DECEPTOR objects will be deployed on one or more systems, optionally define how the DECEPTORs would be monitored, and also optionally define what type of responses to adversarial contact will be performed. Next the administrator may deploy the DECEPTOR to the endpoint using one or more existing content or software distribution mechanisms of the platform (e.g., the EPP or EPDRP). Once the DECEPTOR executes on the endpoint it may begin to analyze the system for the optimal DECEPTOR object configuration. Once the analysis has been completed this DECEPTOR object is deployed on the system by the DECEPTOR and monitoring rules are implemented at the endpoint. In addition, the DECEPTOR also optionally uploads back to the management service this information, which may then be used for future analysis (e.g., by performance module 110) of DECEPTOR object effectiveness for the deployed environment.

Once an adversary has breached an endpoint or network and attempts to view, access, or use a DECEPTOR object, the activity may trigger a monitoring rule for the DECEPTOR object. This rule may define which event get sent back to the management service along with any responses to the trigger that have been defined. In certain cases, issuing an alert may be the only action taken as a result of a DECEPTOR object trigger. Nevertheless, in additional or alternative examples, the security action may further include other steps, as further discussed above.

Figure 5:
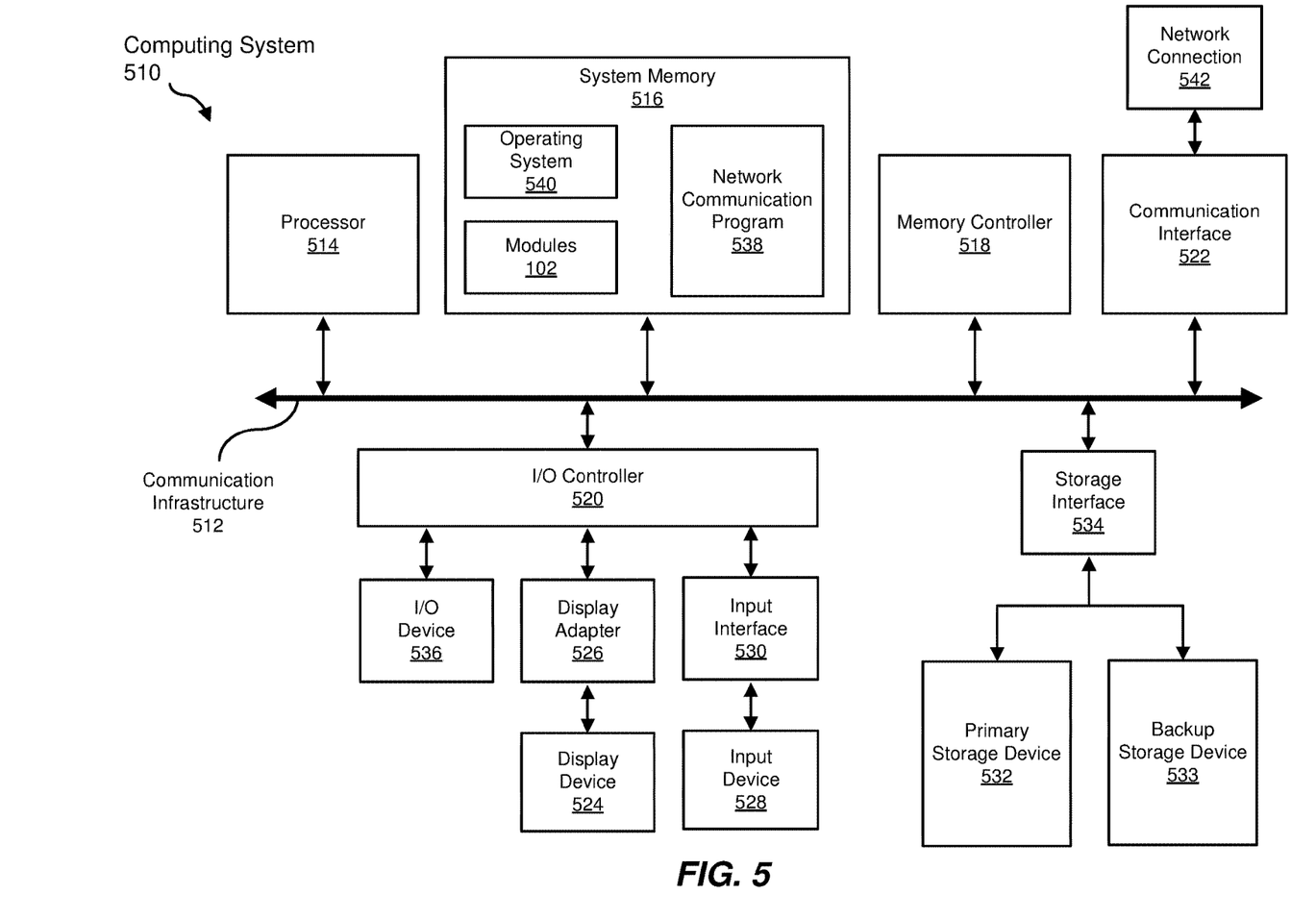
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
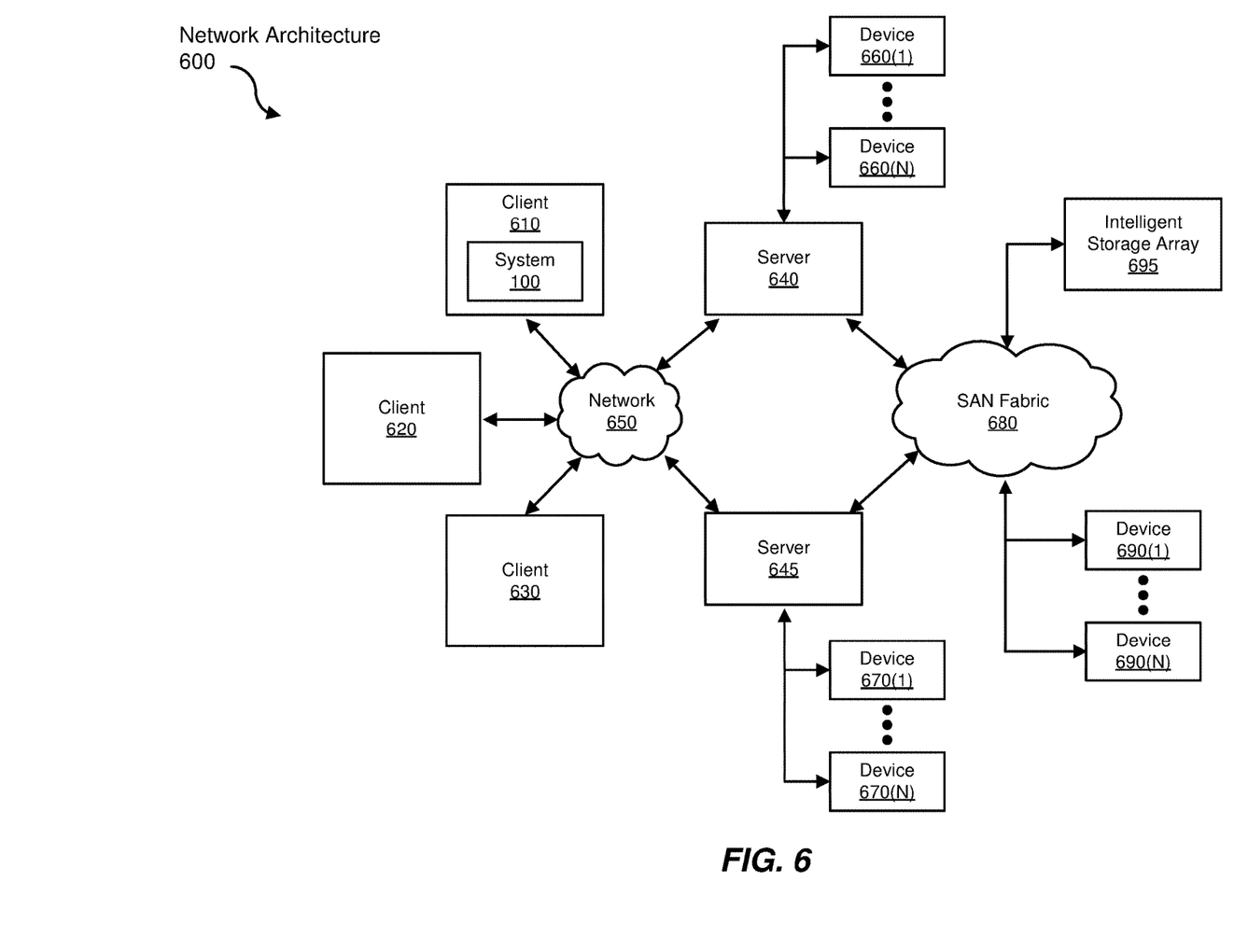
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for monitoring bait to protect users from security threats.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may transform a computing system by rendering a bait computing resource invisible to a trusted application, as discussed above in accordance with method 300. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for monitoring bait to protect users from security threats, at least a portion of the method being performed by a computing device comprising at least one processor, the method comprising:
    monitoring a bait computing resource to detect attempts to access the bait computing resource, the bait computing resource comprising a registry key;
    virtualizing, using a system filter driver, the bait computing resource to prevent a false positive by hiding the bait computing resource from at least one trusted application that has been categorized as safe, the filter driver hiding the bait computing resource by preventing the registry key from being revealed to the trusted application;
    detecting an attempt by a different application to access the virtualized bait computing resource; and
    performing a security action to protect a trusted user by reporting the attempt to access the virtualized bait computing resource by the different application;
    wherein virtualizing the bait computing resource enables the bait computing resource to deceive attackers into interacting with the bait computing resource while the bait computing resource remains unseen by legitimate users to avoid false positives.

2. The computer-implemented method of claim 1, wherein the virtualized bait computing resource further comprises a file.

3. The computer-implemented method of claim 1, wherein virtualizing the bait computing resource is performed by an operating system filter driver.

4. The computer-implemented method of claim 1, wherein virtualizing the bait computing resource to prevent the false positive comprises:
    generating a list of trusted applications; and
    virtualizing the bait computing resource to hide the bait computing resource from each application on the list of trusted applications.

5. The computer-implemented method of claim 4, wherein generating the list of trusted applications comprises identifying applications that are used by the trusted user.

6. The computer-implemented method of claim 1, wherein virtualizing the bait computing resource renders the bait computing resource invisible to the trusted user.

7. The computer-implemented method of claim 1, wherein the attempt to access the virtualized bait computing resource by the different application is reported to an administrator to enable the administrator to investigate whether the attempt constitutes an attempted security breach.

8. The computer-implemented method of claim 1, wherein the bait computing resource is deployed across a network from a management service to an endpoint agent on the computing device.

9. The computer-implemented method of claim 1, wherein the method is performed through an EPDRP platform that is executing on the computing device.

10. The computer-implemented method of claim 9, wherein the EPDRP platform deploys the bait computing resource by leveraging an existing deployment function that was previously used to deploy non-bait computing resources.

11. A system for monitoring bait to protect users from security threats, the system comprising:
- a monitoring module, stored in memory, that monitors a bait computing resource to detect attempts to access the bait computing resource, the bait computing resource comprising a registry key;
- a virtualization module, stored in memory, that virtualizes, using a system filter driver, the bait computing resource to prevent a false positive by hiding the bait computing resource from at least one trusted application that has been categorized as safe, the filter driver hiding the bait computing resource by preventing the registry key from being revealed to the trusted application;
- a detection module, stored in memory, that detects an attempt by a different application to access the virtualized bait computing resource;
- a performance module, stored in memory, that performs a security action to protect a trusted user by reporting the attempt to access the virtualized bait computing resource by the different application; and
- at least one physical processor configured to execute the monitoring module, the virtualization module, the detection module, and the performance module;
- wherein the virtualization module virtualizing the bait computing resource enables the bait computing resource to deceive attackers into interacting with the bait computing resource while the bait computing resource remains unseen by legitimate users to avoid false positives.

12. The system of claim 11, wherein the virtualized bait computing resource further comprises a file.

13. The system of claim 11, wherein the virtualization module virtualizes the bait computing resource using an operating system filter driver.

14. The system of claim 11, wherein the virtualization module virtualizes the bait computing resource to prevent the false positive at least in part by:
- generating a list of trusted applications; and
- virtualizing the bait computing resource to hide the bait computing resource from each application on the list of trusted applications.

15. The system of claim 14, wherein the virtualization module generates the list of trusted applications by identifying applications that are used by the trusted user.

16. The system of claim 11, wherein the virtualization module virtualizes the bait computing resource in a manner that renders the bait computing resource invisible to the trusted user.

17. The system of claim 11, wherein the performance module reports the attempt to access the virtualized bait computing resource by the different application to an administrator to enable the administrator to investigate whether the attempt constitutes an attempted security breach.

18. The system of claim 11, wherein the monitoring module receives the bait computing resource from a management service that deploys the bait computing resource across a network to the monitoring module.

19. The system of claim 11, wherein the system comprises an EPDRP platform.

20. A non-transitory computer-readable medium comprising one or more computer-readable instructions that, when executed by at least one processor of a computing device, cause the computing device to:
- monitor a bait computing resource to detect attempts to access the bait computing resource, the bait computing resource comprising a registry key;
- virtualize, using a system filter driver, the bait computing resource to prevent a false positive by hiding the bait computing resource from at least one trusted application that has been categorized as safe, the filter driver hiding the bait computing resource by preventing the registry key from being revealed to the trusted application;
- detect an attempt by a different application to access the virtualized bait computing resource; and
- perform a security action to protect a trusted user by reporting the attempt to access the virtualized bait computing resource by the different application;
- wherein virtualizing the bait computing resource enables the bait computing resource to deceive attackers into interacting with the bait computing resource while the bait computing resource remains unseen by legitimate users to avoid false positives.

* * * * *